United States Patent
Shimomura et al.

(10) Patent No.: US 6,846,520 B2
(45) Date of Patent: Jan. 25, 2005

(54) EPOXY RESIN COMPOSITION, SURFACE TREATMENT METHOD, LIQUID-JET RECORDING HEAD AND LIQUID-JET RECORDING APPARATUS

(75) Inventors: Akihiko Shimomura, Kanagawa (JP); Hiromichi Noguchi, Tokyo (JP); Isao Imamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 10/334,915

(22) Filed: Jan. 2, 2003

(65) Prior Publication Data
US 2003/0171504 A1 Sep. 11, 2003

(30) Foreign Application Priority Data

Jan. 17, 2002 (JP) .......................... 2002-008440
Feb. 21, 2002 (JP) .......................... 2002-045279

(51) Int. Cl.[7] .................. B41J 2/135; C09D 137/00; C09D 183/04
(52) U.S. Cl. .................. 427/510; 427/515; 522/148; 525/476; 526/194; 526/219.1; 526/245; 526/268; 528/23; 528/26; 528/27; 347/65; 430/280.1
(58) Field of Search .................. 427/510, 515, 427/372.2; 522/148; 525/476; 526/194, 219.1, 245, 268, 126, 250, 255, 273; 528/23, 26, 27, 402, 408, 421; 347/65; 430/280.1, 320; 549/545, 551, 554, 563; 556/437, 445, 450, 465

(56) References Cited

U.S. PATENT DOCUMENTS

| | | | |
|---|---|---|---|
| 4,688,052 A | 8/1987 | Inamoto et al. | 346/140 |
| 4,688,053 A | 8/1987 | Noguchi et al. | 346/140 |
| 4,689,640 A | 8/1987 | Shimomura | 346/140 |
| 4,839,668 A | 6/1989 | Sato et al. | 346/140 |
| 4,839,669 A | 6/1989 | Sato et al. | 346/140 |
| 4,970,532 A | 11/1990 | Komuro et al. | 346/140 |
| 5,086,307 A | 2/1992 | Noguchi et al. | 346/140 |
| 5,178,959 A * | 1/1993 | Eckberg et al. | 428/447 |
| 5,196,558 A * | 3/1993 | Inomata et al. | 556/434 |
| 5,451,992 A | 9/1995 | Shimomura et al. | 347/45 |
| 5,510,818 A | 4/1996 | Shimomura et al. | 347/65 |
| 5,524,784 A | 6/1996 | Shiba et al. | 216/27 |
| 5,650,805 A | 7/1997 | Shimomura et al. | 347/20 |
| 5,663,752 A | 9/1997 | Imamura et al. | 347/65 |
| 5,738,911 A | 4/1998 | Imamura et al. | 427/387 |
| 5,770,271 A | 6/1998 | Imamura | 427/412.1 |
| 5,980,026 A | 11/1999 | Imamura et al. | 347/65 |
| 6,291,545 B2 | 9/2001 | Imamura | 522/181 |
| 6,409,931 B1 | 6/2002 | Shimomura et al. | 216/27 |
| 6,472,129 B2 | 10/2002 | Noguchi et al. | 430/326 |
| 6,472,179 B2 * | 10/2002 | Stahl et al. | 435/69.7 |
| 6,484,399 B2 | 11/2002 | Aono et al. | 29/890.1 |
| 6,586,495 B1 | 7/2003 | Shimomura et al. | 522/112 |
| 2003/0025760 A1 | 2/2003 | Imamura et al. | 347/45 |

FOREIGN PATENT DOCUMENTS

| | | |
|---|---|---|
| EP | 0 507 493 A1 | 10/1992 |
| EP | 0 572 179 A2 | 12/1993 |
| EP | 0 942 024 A2 | 9/1999 |
| EP | 1 085 031 A2 | 3/2001 |
| JP | 2-39944 | 2/1990 |
| JP | 90-033053 * | 7/1990 |

* cited by examiner

Primary Examiner—David J. Buttner
(74) Attorney, Agent, or Firm—Fitzpatrick, Cella, Harper & Scinto (57) ABSTRACT

The present invention relates to an epoxy resin composition. The epoxy resin composition contains an epoxy resin and a cationic polymerization catalyst. The epoxy resin has at least two alicyclic epoxy groups, at least one perfluoroalkyl group having 6 to 12 carbon atoms, at least one alkylsiloxane group, and at least one cyclic group.

10 Claims, 4 Drawing Sheets

EPOXY RESIN COMPOSITION, SURFACE TREATMENT METHOD, LIQUID-JET RECORDING HEAD AND LIQUID-JET RECORDING APPARATUS

BACKGROUND OF THE INVENTION

1. Field of the Invention

The present invention relates to a curing epoxy resin composition which permits water-repellent and ink-repellent surface treatment. Particularly, the present invention relates to an epoxy resin composition capable of forming a film pattern by ultraviolet irradiation and capable of forming a cured film which can be selectively removed by an excimer laser, a surface treatment method using the resin composition, a liquid-jet recording head subjected to ink-repellent treatment with the epoxy resin composition, and a liquid-jet recording apparatus using the liquid-jet recording head.

2. Description of the Related Art

In various fields, a method of applying a water-repellent coating to a member required to have water resistance and ink repellency to obtain these properties is generally known, and resin materials and coating materials used for the method have been developed. For example, films of fluoropolyolefin and a fluororesin coating material having perfluoro groups are thermally and chemically stable, excellent in weather resistance, water resistance, chemical resistance, solvent resistance, etc., and further excellent in release property, abrasion resistance and water repellency, and widely used for various applications.

Meanwhile, a liquid-jet recording head adapted to discharge liquid droplets such as ink droplets through discharge nozzles, causing the liquid droplets to adhere to a recording medium such as a sheet of paper so as to record or form an image thereon, is recently required to be able to discharge smaller liquid droplets, be driven with a higher driving frequency, and have a larger number of nozzles, in order to improve recording properties. Therefore, a treatment for maintaining the nozzle surface in a same surface state has becomes more important. However, it is difficult to selectively treat the surface of a nozzle or precisely treat the surface in the form of a pattern by using a known coating material so as to avoid ink adhesion. This is because firstly, a material mainly comprising a compound having a photosensitive functional group must be used as a surface treatment material for treating the surface in the form of a pattern so that the material has characteristics like a photoresist suitable for pattern treatment; but it is highly difficult to design the molecule of such a compound so that the compound has water repellency and ink repellency at the same time.

Secondly, if the nozzle surface can be treated with an existing fluorocarbon material, a film structure must be designed so as to maintain the properties of the surface for a long period of time. A material permitting such a pattern surface treatment having the above-described properties is greatly valuable for surface treatment of an ink-jet print head, as described below.

Namely, in an ink-jet recording system in which an ink is ejected as droplets, the discharge orifice (nozzle) is preferably designed to have the following characteristics:

(1) The residual ink of ink columns having turned into droplets is immediately held back into a nozzle.

(2) The ink droplets adhering to the nozzle surface can be readily wiped off by a cleaning operation.

(3) The nozzle surface has excellent scratch resistance against the cleaning operation and paper transfer.

Figure 1:
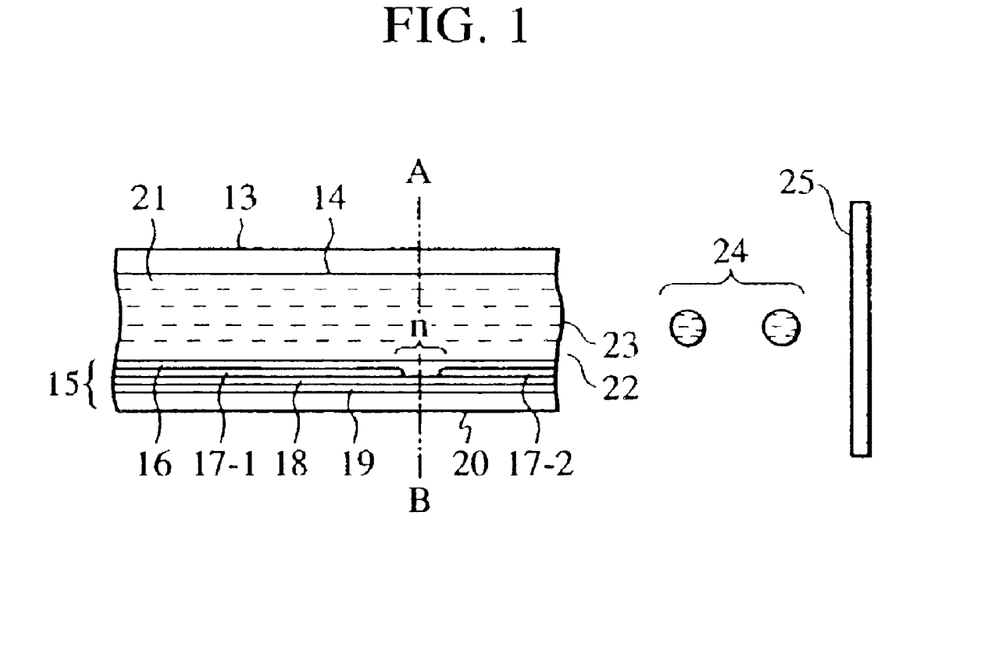
FIG. 1 is a sectional view showing a principal portion of an example of a liquid-jet recording head.

(4) In repeated formation of droplets and ink refilling, a meniscus is formed on the nozzle surface (refer to reference numeral 23 in FIG. 1).

(5) The discharge direction is a normal to the meniscus.

(6) Even with an ink having low surface tension, or under low-negative pressure, the interfacial tension, i.e., the contact angle, is sufficient to form the meniscus.

The reason why the above characteristics are required for the discharge orifice is that, if a recording liquid such as an ink adheres to the periphery of the orifice, the discharge (flying) direction of the ink droplets discharged from the orifice is deviated, making it difficult to print highly accurately and degrading printing performance. In order to prevent adhesion of the ink to the vicinity of the discharge orifice, which causes a deviation in the discharge direction, methods have been developed in which a discharge orifice surface is subjected to a water-repellent treatment.

For example, Japanese Patent Laid-Open No. 2-39944 describes a method of ink-repellent treatment with a polymer having fluoroacetyl groups and silazane groups.

On the other hand, as a result of the increasing demand for sophisticated printers utilizing liquid-jet recording systems for recording images, the recording liquid to be used for such recording systems is also required to show sophisticated characteristics. More often, the recording liquid to be used for such recording systems is chemically regulated to be basic with a pH value of 7 to 11 in order to further improve dissolution stability and dispersion stability of contents, and thus a structural material highly resistant against alkali and hydrolysis has to be used for a printer member. Also, the miniaturization of liquid droplets discharged from the liquid-jet recording head requires that a water-repellent film formed on the liquid-jet recording head has fine processability. A conceivable method for finely processing a cured film of an epoxy resin is a method of removing the cured film of the epoxy resin by selective irradiation of an excimer laser. However, if the cured film itself has low abrasion property, it is difficult to finely process the cured film with precision. For example, when the cured film has insufficient abrasion property, a deposit is produced between a removed portion and a non-removed portion of the film.

In addition, when a recording liquid containing a polar organic solvent or a recording liquid showing such a high pH value is used, a water-repellent agent applied for treating the surface of the discharge orifice in order to satisfy the above requirements can damage the film forming property of the agent and the tight adhesion of the agent to the surface of the discharge orifice as it comes to contact with the solvent of the recording liquid, particularly the polar organic solvent of the recording liquid. Then, the coat of the water-repellent agent can peel off, resulting in a loss of surface water repellence.

SUMMARY OF THE INVENTION

Accordingly, it is an object of the present invention to provide an epoxy resin composition that can be suitably used for a water-repellent agent or water-repellent coating to be applied to an area of a member that can be brought into contact with a solution or material containing a component such as a polar organic solvent which might damage the film forming ability and the adhesion of the water-repellent agent, and that can form a cured film having excellent micro processability, for example, a good laser abrasion property.

It is another object of the present invention to provide an epoxy resin composition adapted to a surface modifying treatment for maintaining the treated surface constantly in a same state.

Still another object of the present invention is to provide a surface treatment method capable of precisely imparting water-repellency to a predetermined area of a surface of a member by using the epoxy resin composition.

A further object of the present invention is to provide a liquid-jet recording head and liquid-jet recording apparatus in which the surface of a substrate is treated with the epoxy resin composition so that the surface of a nozzle can be constantly maintained in a same surface state, and so that ink does not adhere to the surface of a printing head even when the head is brought into contact with a recording medium for a long period of time, thereby permitting high landing precision of dots and long-term maintenance of printing quality.

These objects are achieved by the present invention as described below.

In an embodiment of the present invention, an epoxy resin composition comprises an epoxy resin and a cationic polymerization catalyst. The epoxy resin has, in its molecule, at least two alicyclic epoxy groups, at least one perfluoroalkyl group having 6 to 12 carbon atoms, at least one alkylsiloxane group, and at least one cyclic group other than the alicyclic epoxy groups.

In another embodiment of the present invention, a surface treatment method comprises the following steps:

(i) The step of coating the epoxy resin composition on the surface of a substrate to form a film;

(ii) The step of irradiating the film with active energy rays in a position-selective manner; and (iii) The step of dissolving a portion of the film, which is not irradiated with the active energy ray, in a liquid capable of dissolving the film.

In still another embodiment of the present invention, a surface treatment method comprises the following steps:

(i) The step of coating the epoxy resin composition on the surface of a substrate to form a film;

(ii) The step of curing the film by polymerization; and (iii) The step of selectively removing a portion of the film cured in step (ii).

In a further embodiment of the present invention, a liquid-jet recording head comprises a discharge orifice for discharging a liquid, wherein at least the periphery of the discharge orifice is coated with a cured film of the epoxy resin composition.

In a still further embodiment of the present invention, a liquid-jet recording apparatus comprises the above-described liquid-jet recording head.

The epoxy resin composition of the present invention is an epoxy resin system, and thus a film comprising the resin composition exhibits excellent adhesion to various members, and can be cured at a relatively low temperature to provide a cured product having excellent physical properties as a structural material. Furthermore, since the epoxy resin composition contains an epoxy compound having an alkylsiloxane group and perfluoroalkyl group, the film is significantly improved in resistance to water-soluble organic solvents, particularly polar organic solvents. The film also has improved resistance to pigment dispersion stabilizer, and the like contained in a pigment-based ink. Furthermore, when the resin composition contains a compatibilizer, the compatibilizer provides compatibility between the components of the resin composition, thereby widening the range of component materials of the resin composition of the present invention.

When the film formed by coating and drying the resin composition of the present invention contains, as a catalyst, an onium salt of a Lewis acid which is activated with an active energy ray, the film can be cured in the form of a pattern. Uncured portions of the film can then be removed to permit surface treatment of a member in the form of a pattern.

The surface of a member can be treated in the form of a pattern by a method comprising coating the resin composition on the substrate and then drying the coating to form a film, irradiating the film with an active energy ray through a mask having a desired pattern, and then removing uncured portions of the film by development with a developer. Although the basic steps of this pattern treatment are the same as a photolithography method, a solvent or solvent composition suitable for the film comprising the resin composition is selected as the developer. As the developer, an aromatic hydrocarbon, a ketone, an ester, glycol ester, or a mixture thereof can be used.

In the surface treatment in the form of a pattern using the resin composition of the present invention, so-called post curing is preferably further performed by heating the film or irradiating the film with an active energy ray after development, for completely curing the film of the resin composition.

Therefore, the resin composition of the present invention can be suitably used as a water-repellent agent or water-repellent coating material applied to an area having the opportunity of contact with a solution or material containing a component such as a polar organic solvent, which can damage adhesion of the water-repellent agent, and further can be suitably used for water-repellent and ink-repellent treatment of the discharge orifice surface of the liquid-jet recording head.

Namely, when the resin composition of the present invention is applied to an ink-jet recording apparatus, the precision of selective surface modifying treatment using optical polymerizability, the solid strength of the cured film, the durability as a device due to frictional strength, and the high degree of water repellency and ink repellency result in improvements in properties such as meniscus retention of an aqueous ink, a cleaning property, the precision of a droplet discharge direction, persistency of continuous discharge, suitability for print start after a pause, etc. The meniscus retention represents the property that an ink maintains the ink surface at the nozzle tip by surface tension, and recovers and holds a meniscus at a predetermined position during repeated droplet discharges. With low meniscus retention, the ink leaks from the nozzle tip, the meniscus retreats to decrease the volume of the droplet discharged, or in an extreme case, a defect occurs in discharge of ink droplets.

In the present invention, a cyclic group is introduced into the epoxy resin, and thus a cured film having an improved abrasion property with, for example, an excimer laser, or the like can be obtained. Therefore, a water-repellent film can be precisely formed at a predetermined position of the surface of a member.

Further objects, features and advantages of the present invention will become apparent from the following description of the preferred embodiments with reference to the attached drawings.

DESCRIPTION OF THE PREFERRED EMBODIMENTS

The present invention will be described in detail below with reference to a preferred embodiment.

An epoxy resin composition of the present invention comprises an epoxy resin and a cationic polymerization catalyst having at least two alicyclic epoxy groups, at least one perfluoroalkyl group having 6 to 12 carbon atoms, at least one alkylsiloxane group, and at least one cyclic group in its molecule.

The epoxy resin of the epoxy resin composition is not limited as long as the above conditions are satisfied. However, the alicyclic epoxy groups, the perfluoroalkyl group and the cyclic group are preferably present in branch chains of the epoxy resin, and the alkylsiloxane group is preferably present in a main chain of the epoxy resin. Examples of the epoxy resin of the present invention include epoxy resins represented by formula (1):

Formula (1)

(1)

In formula (1), a is an integer of 1 to 50, b is an integer of 1 to 50, c is an integer of 1 to 50, and d is an integer of 2 to 100. Furthermore, each of $n_1$ to $n_3$ and $n_5$ to $n_7$ is an integer of 1 to 5, and $n_4$ is an integer of 2 to 200.

In formula (1), R1, R4 to R7, R10 and R15 are independently a hydrogen atom, a straight chain or branched chain alkyl group having 1 to 3 carbon atoms, R2, R3, R8 and R9 are independently a hydrogen atom, a straight chain or branched chain of an alkyl group having 1 to 3 carbon atoms, and a nitrile group, and Rf is a straight chain or branched chain of a perfluoroalkyl group having 6 to 12 carbon atoms, particularly a perfluoroalkyl group having 8 to 10 carbon atoms.

Furthermore, Z represents a cyclic group. The cyclic group is not limited as long as it can improve the abrasion property of a cured film of the epoxy resin. For example, in order to improve the abrasion property with a laser in the ultraviolet region, at least one cyclic group selected from formulas (2) to (9) below is preferably introduced.

(2)

(3)

(4)

(5)

(6)

(7)

(8)

(9)

The epoxy resin represented by formula (1) can be obtained by copolymerization of perfluoroalkyl methacrylate, a vinyl compound having a cyclic group, 3,4-oxycyclohexylmethyl methacrylate, and an azo group-containing polysiloxaneamide at an appropriate monomer ratio according to an ordinary method. The epoxy resin may by commercially obtained.

More specifically, the epoxy resin can be synthesized by heating, light irradiation or heating and light irradiation of a compound represented by structural formula (1)-i below in the coexistence with vinyl monomers represented by structural formulae (1)-ii, (1)-iii and (1)-iv so as to produce radical species.

(wherein R1 to R14 are defined as the same as R2, R3, R8 and R9, n8 and n9 each represent 0 or an integer of 1 to 6, and X represents a halogen atom).

(wherein R1, R10, R15, n1 and n7 are defined the same as in formula (1)).

A compound represented by formula (1)-i can be synthesized by the method disclosed in, for example, Japanese Patent Publication No. 2-33053. Namely, the compound can be obtained by reaction of a diamine represented by formula (1)-v below and dihalides represented by formulae (1)-vi and (1)-vii below.

An example of the epoxy resin represented by formula (1) is an epoxy resin represented by formula (10) below. In formula (10), R1, Z, n4, and a to d are defined the same as in formula (1).

Preferably, in the resin represented by the structural formula (10), a is 20 to 50, b is 5 to 30, c is 5 to 40, d is 20 to 70, n4 is 20 to 150, and the number average molecular weight is 8,000 to 22,000.

A more preferred example A-1 of the epoxy resin suitably used in the present invention is represented by the following structural formula:

(A-1) Acrylic Epoxy Resin Having a Number Average Molecular Weight of About 20,000

(wherein the monomer unit a is 30 mol %, the monomer unit b is 15 mol %, the monomer unit c is 15 mol %, and the monomer unit d is 40 mol %.)

Another preferred example (A-2) of the epoxy resin suitably used in the present invention is an acrylic epoxy resin in which in formula (10), the monomer unit a is 30 mol %, the monomer unit b is 15 mol %, the monomer unit c is 15 mol %, the monomer unit d is 40 mol %, Z is a cyclic group represented by formula (9), n is 100, and the number average molecular weight is about 20,000.

In the present invention, the epoxy resin represented by formula (1) preferably has a number average molecular weight of 8,000 to 22,000, and more preferably has a number average molecular weight of 8,500 to 20,000 to ensure durability of the water-repellent coating.

In the structure represented by formula (1) or (10), a 3,4-epoxycyclohexyl group is shown as an alicyclic epoxy group, but the alicyclic group is not limited to this, and an epoxycyclopropyl group and an epoxycyclopentyl group may be introduced.

The epoxy resin may be used independently. Since the resin has a high molecular weight, the resin is preferably mixed with an oligomer having a lower molecular weight of the resin and a solvent to improve coating performance for a substance to be treated with the resin composition, and to improve the drying property of a film after the solvent is evaporated, thereby improving the workability of treatment. Namely, the resin represented by formula (1) or another high-molecular-weight resin is preferably used to function as a binder. The resin represented by formula (1) or other high-molecular-weight resin is preferably used as the binder for an exposure work in the form of a pattern on a resin film. The oligomer is preferably a resin having a lower molecular weight than the resin represented by formula (1), but another low-molecular-weight oligomer may be used.

Although the resin composition of the present invention mainly comprises the epoxy resin represented by formula (1) and the catalyst, the resin composition preferably further contains a compatibilizer according to demand. Preferred examples of the compatibilizer include compounds represented by the following formula (11) and/or (12).

A preferred example of this compound is a compound with q=0, i.e., m-bis-[1-(2,3-epoxypropoxy)-2,2,2-trifluoro-1-(trifluoromethyl)ethyl]benzene.

The compound represented by formula (11) or (12) has a fluoroalkyl group, and thus the film formed by using such a compound has a small function to decrease the surface energy and has low water repellency and ink repellency because of its short chain length. The compound represented by formula (11) or (12) can be synthesized by reaction of a divalent alcohol and epichlorohydrin corresponding to a compound in which groups containing the epoxy groups at both ends are removed from the compound represented by general formula (11) or (12), by an ordinary method.

The resin composition of the present invention contains a polymerization initiator as a catalyst for curing the resin composition. In the present invention, particularly, the resin composition is designed so as to have high reactivity to an onium salt of Lewis acid which is activated by active energy rays permitting curing at low temperature. Therefore, the surface of a substrate can be selectively treated by a photolithography method using the resin composition, and the resin composition is suitable for surface modification of a substrate which cannot be easily maintained at high temperature. Examples of the catalyst include bis(4-tert-butylphenyl)iodonium salt, Optomer SP-150 and Optomer SP-170 (trade name, produced by Asahidenka Kogyo Co., Ltd.), and the like.

The chemical structure of Optomer SP-150 is represented by the following formula:

Formula (11)

(11)

(wherein p is an integer 0 to 2)

A preferred example of this compound is a compound with p=o, i.e., 2,2-bis(4-glycidyloxyphenyl) hexafluoropropane.

Formula (12)

(12)

(wherein q is an integer of 0 to 2, and )

Optomer SP-150

The chemical structure of Optomer SP-170 is represented by the following formula:

Optomer SP-170

In addition, Irgacure 261 (trade name, produced by Chiba Specialty Co., Ltd.) represented by the following structural formula, and the like can also be used as the polymerization initiator.

Irgacure 261

The resin composition of the present invention is preferably combined with an epoxy polymer which can participate in cross-linking reaction by itself, as a binder polymer other than the resin represented by formula (1). Examples of such a polymer include an acrylic resin obtained by copolymerization of an acryl monomer having a side-chain epoxy group, a vinyl polymer obtained by polymerization of a vinyl monomer having an alycyclic epoxy group in its side chain, a polyester polymer having an alycyclic epoxy group in its side chain (for example, EHPE3150; produced by Daicel Chemical Industries, Ltd.), and the like. If a polymer without such an epoxy group is used, physical properties are intentionally controlled according to the application thereof. Examples of such a polymer include general-purpose polymer compounds for coating, such as polymers of bisphenol epoxy resins (trade names PKHC and PKHJ, produced by Union Carbide Co., Ltd.), poly(ethylene/vinyl acetate), phenol resins, polycarbonate resins, polyester resins, polyamide resins, soluble polyimide resins, and the like.

As described above, the epoxy resin composition of the present invention may contain the components below in a nonpolar solvent.

A: Epoxy resin;
B: Cationic polymerization catalyst; and
C: Compatibilizer, if needed.

The preferred mixing ratio of these components A, B and C in the resin composition is as follows.

When the component A is used together with an oligomer, the mixing ratio depends upon the softening point and glass transition temperature of each of both components, and thus the ratio is not generally limited. However, the ratio of oligomer:component A is 10:90 to 90:10 (ratio by mass). The ratio of the catalyst B is in the range of 0.5 part by mass to 7 parts by mass relative to 100 part by mass of the total amount of the epoxy resin components. In some cases, the oligomer has low compatibility with the polymer, and thus the compatibilizer C is preferably used.

The epoxy resin composition of the present invention is used for treating the surface of a substrate by heating or irradiation with active energy rays. Specifically, the resin composition of the present invention is dissolved in an aromatic solvent, an aliphatic hydrocarbon solvent, an ester solvent, an ether solvent, a fluorocarbon solvent, or the like, and the resultant solution can be coated on the surface of the substrate by any one of various coating/printing methods such as roll coating, spin coating, spray coating, screen printing, gravure printing, etc. After the solution is coated on the surface of the substrate, the formed film is cured by heating or irradiation with active energy rays. As a source of active energy rays for curing, a mercury lamp, a laser beam, an electron beam, or the like, which contains large amounts of bright line spectra in the range of wavelengths of 200 to 480 nm, is preferred.

The epoxy resin composition of the present invention preferably contains the binder component, and is prepared so as to form a dry solid film. Also, the epoxy resin composition can facilitate selective surface treatment of the substrate by patterning similar to a photoresist process. In this case, a coating solution containing the resin composition of the present invention is coated on the substrate, and then the solvent is removed to form a dry film. Then, the film is irradiated with active energy rays through a mask having an appropriate pattern or irradiated with active energy rays in the form of a pattern, and then the uncured portion of the film is removed by development with a solvent system which can dissolve the film. When energy beam irradiation in the form of a pattern is insufficient for curing, post curing is preferably performed after development. As an energy source for post curing, heating with a microwave or the like, or active energy ray irradiation by an electron beam, ultraviolet rays, or the like is used.

The above-described surface modifying method of the present invention enables water-repellent and oil-repellent treatment with excellent film adhesion to the substrate and surface hardness of the film, and thus has the great advantage that the substrate can be modified to have excellent durability.

In an example of application of the epoxy resin composition of the present invention to a liquid-jet recording head, for example, an ink-jet recording head, the nozzle surface of the liquid-jet recording head is treated with the resin composition of the present invention to form a surface which causes no strong adhesion of an ink and which has good release property, facilitating wiping of the ink adhering to the nozzle surface by a cleaning operation.

As a cleaning mechanism mounted on the liquid-jet recording head, for example, the ink-jet recording head, or a cleaning method, for example, the ink adhering to the orifice surface of the ink-jet recording head is wiped with a rubber blade, the ink in a nozzle is sucked by a pump, or the ink is discharged at a position other than on a recording sheet. Any one of these methods cannot eliminate the phenomenon that small droplets of excessive ink adhere to the periphery of the nozzle because not all of the ink is turned into ink droplets when an ink column withdrawn by discharge pressure forms into a droplet. Therefore, if the small droplets spontaneously drop, are sucked back to the inside of the nozzle, or are readily removed, the droplets have no influence on ink discharge.

The epoxy resin composition of the present invention can be cured at relatively low temperature to provide a cured film having excellent water repellency, oil repellency, adhesion to the substrate, chemical resistance, and friction resistance.

Figure 2:
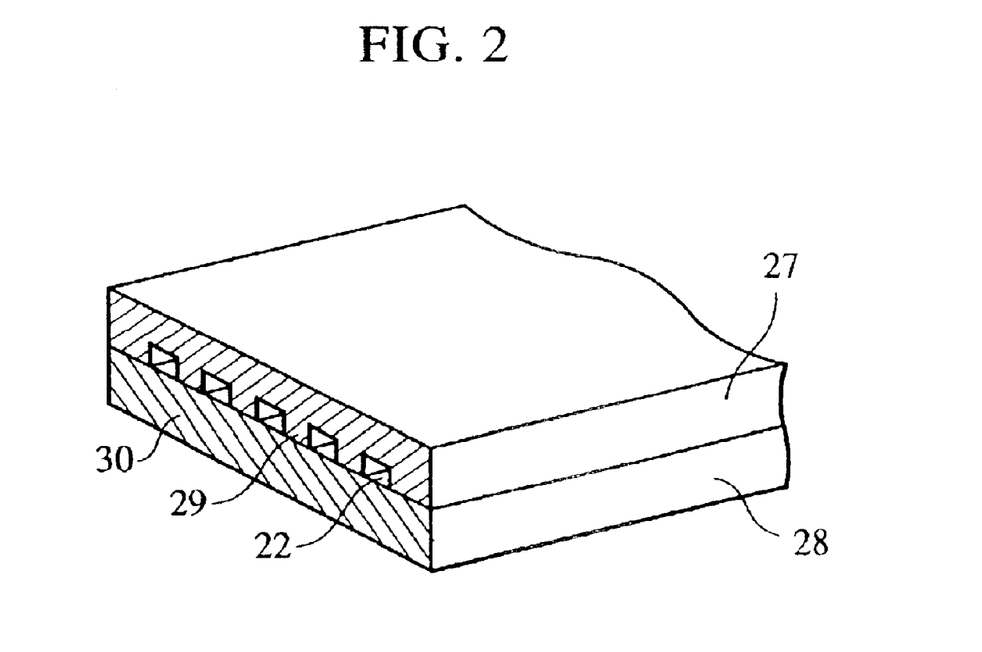
FIG. 2 is a perspective view of the principal portion of the head shown in FIG. 2.

FIGS. 1 and 2 show the principal portion of an example of the construction of a liquid-jet recording head to which the resin composition of the present invention can be applied. FIG. 1 is a sectional view taken along a flow path of an ink, and FIG. 2 is a perspective view of the liquid-jet recording head shown in FIG. 1. In FIG. 2, reference numeral 27 denotes a glass plate, and reference numeral 28 denotes a substrate comprising a discharge energy generating element (not shown).

The recording head 13 shown in FIG. 1 comprises a substrate 15 on which a discharge energy generator is disposed, and a member 14 laminated on the substrate 15 by forming a predetermined pattern of a cured product of a thermosetting resin composition and/or an active energy ray curing resin composition to form at least a flow path.

The substrate 15 comprises a base 20 made of a material with a high heat release effect, such as alumina or the like, and a heat storage layer 19, an exothermic resistor layer 18 made of a metal, electrodes 17-1 and 17-2 made of aluminum or the like, and a protective layer 16, which are laminated in that order on the surface of the base 20. By supplying electricity to the electrodes 17-1 and 17-2, the discharge energy generating element formed in a portion (in the region shown by character n in FIG. 1) of the exothermic resistor layer 18, in which the electrodes are not formed, generates heat to exert thermal energy on an ink positioned above the element.

In recording, in the state in which an ink 21 is caused to fill in a discharge orifice (orifice) 22 as a micro opening at the tip of the member 14, when a current is passed through the electrodes 17-1 and 17-2 corresponding to a recording signal, heat is rapidly generated from the region n, and bubbles occur in the ink 21 in contact with the region n due to film boiling to discharge the ink 21 as droplets 24 from the orifice 22 by the pressure of the bubbles. Therefore, the droplets 24 fly toward a recording medium 25.

In the liquid-jet recording head according to the present invention, a cured film 30 comprising the resin composition of the present invention is used as a water-repellent and ink-repellent agent in the peripheries of at least the orifice openings 22 of the orifice surface 29 (FIG. 2), thereby preventing the droplets from adhering to the surface to prevent a deviation in the discharge direction of the droplets. In addition, the cured film comprising the resin composition of the present invention not only exhibits excellent adhesion to the substrate but also causes no deterioration in water repellency and adhesion even when the ink contains an organic solvent, particularly, a polar organic solvent.

Figure 3:
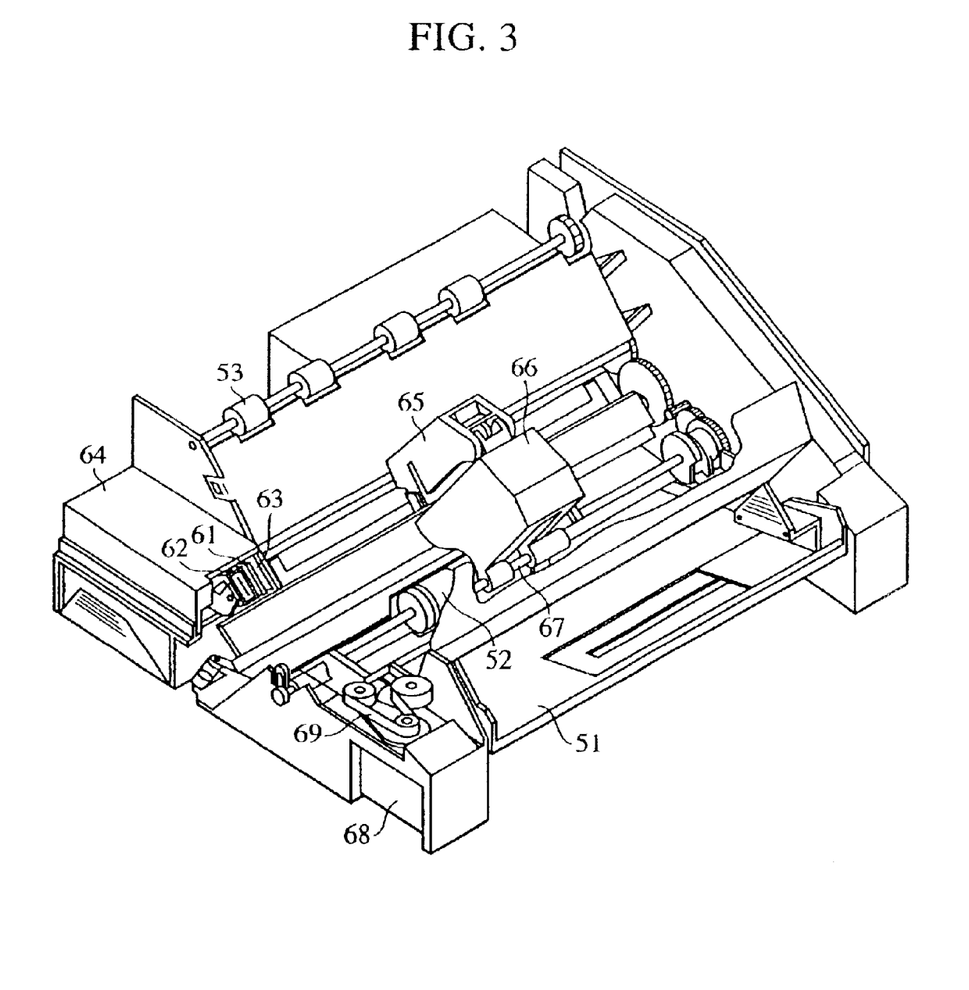
FIG. 3 is a drawing showing an example of a liquid-jet recording apparatus including a multi-head.

FIG. 3 shows an example of a liquid-jet recording apparatus including such a multi-head as shown in FIG. 2. In FIG. 3, reference numeral 61 denotes a blade serving as a wiping member, one end of which is a fixed end held by a blade holding member to establish a cantilever state. The blade 61 is disposed at a position adjacent to a recording region of the recording head. In this example, the blade 61 is held to project into the movement path of the recording head. Reference numeral 62 denotes a cap disposed at a home position adjacent to the blade 61, and is moved perpendicularly to the movement direction of the recording head to cap the orifices in contact therewith.

Furthermore, reference numeral 63 denotes an ink absorber provided adjacent to the blade 61 and held to project into the movement path of the recording head in the same manner as the blade 61. The blade 61, the cap 62 and the ink absorber 63 constitute a discharge recovery section 64 for removing moisture, dust particles, and the like from the ink discharge orifice surface by the blade 61 and the ink absorber 63.

Reference numeral 65 denotes a recording head for recording in a liquid-jet system, for example, having a construction in which an ink is discharged by thermal energy, as shown in FIGS. 1 and 2. Reference numeral 66 denotes a carriage for moving the recording head 65 mounted thereon. The carriage 66 is slidably engaged with a guide shaft 67, and partially connected (not shown in the drawing) to a belt 69 driven by a motor 68. Therefore, the carriage 66 can be moved along the guide shaft 67, i.e., can be moved to the recording region of the recording head 65 and the adjacent region thereof.

Reference numeral 51 denotes a paper feed section into which a recording medium is inserted, and reference numeral 52 denotes a paper feed roller driven by a motor not shown in the drawing. This construction permits the recording medium to be fed to a position opposite to the discharge orifice surface of the recording head, and expelled through a paper-expelling roller 53 with proceeding of recording.

In the above-described construction, when the recording head 65 is returned to the home position at the end of recording, the cap 65 of the head recovery section 64 is retreated from the movement path of the recording head 65, while the blade 61 projects into the movement path. As a result, the orifice surface of the recording head 65 is wiped. When the recording head 65 is capped with the cap 62 in contact with the orifice surface, the cap 62 is moved to project into the movement path of the recording head 65.

When the recording head 65 is moved from the home position to the start position of recording, the cap 62 and the blade 61 are at the same positions as the time of wiping. As a result, in this movement, the orifice surface of the recording head 65 is wiped. The recording head 65 is moved to the home position at the times of recording end and recovery, but the recording head 65 is also moved to the home position adjacent to the recording region of the recording head at predetermined intervals when the recording head 65 is moved in the recording region for recording. During this movement, the discharge surface is also wiped.

In color recording, the ink jet recording apparatus can use a recording head in which discharge orifices for cyan, magenta, yellow and black inks are arranged in parallel. Alternatively, recording heads for the respective colors may be arranged in parallel. In this case, each of the color inks may be discharged from one discharge orifice, or simultaneously discharged from a plurality of discharge orifices to adhere at least two droplets of the same color to the recording medium.

The liquid-jet recording head of the present invention is subjected to surface treatment with an ink repellent treatment material comprising the above-described epoxy resin composition of the present invention, and has the chemical properties described in Examples below. Therefore, an ink is less adhered, or the adhered ink can be easily removed by a cleaning wiper blade, thereby significantly improving substantial retention of a print.

An example of the method of using the epoxy resin composition of the present invention will be described. In curing a film comprising the resin composition of the present invention with active energy rays, as described above, a photo cation catalyst which releases a Lewis acid by light can be used as a catalyst.

<Film Forming Method>

The epoxy resin composition of the present invention used in this method is dissolved in an organic solvent, and used in the form of a coating solution. With a coating thickness of as small as several $\mu$m, an ordinary fine coating device such as a roll coater, a spin coater, a spray coater, or the like can be used. Alternatively, the coating solution may be coated on a release sheet to form a dry film, and the dry film may be bonded to the surface of a substrate by using a laminator or the like to form a film on the surface of the substrate.

A first method of treating the surface of the substrate in the form of a pattern can be achieved by selectively irradiating the film with active energy rays through a mask having a predetermined pattern, and then performing development with a developer to remove uncured portions of the film. Although these basic steps are the same as the photolithography process, a solvent or a solvent composition suitable for the film comprising the resin composition of the present invention must be selected as the developer. As the developer, any one of aromatic hydrocarbons, ketones, esters, glycol ethers, and the like, and mixtures thereof can be used. In order to achieve the completion of the curing reaction of the film, heating or active energy ray irradiation is preferably performed as post curing after development.

A second method of treating the surface of the substrate in the form of a pattern comprises the first step (1) of coating the coating solution on the substrate and drying the coating to form a film, the second step (2) of irradiating the whole surface with active energy rays which accelerate polymerization to cure the film, and the third step (3) of irradiating the film with decay active energy rays to selectively remove a desired portion of the cured portion of the film. As the active energy rays for accelerating polymerization, ultraviolet rays rich in light at wavelengths of 250 to 480 $\mu$m can be used. As the decay active energy rays, light at wavelengths of 210 $\mu$m or less, an excimer laser, or the like can be used. In the second method, in order to complete curing of the film, the film is preferably heat-treated or irradiated with polymerizing active energy rays in any one of the steps.

As described above, the epoxy resin composition of the present invention is useful as a water repellent agent or water repellent coating material applied to a portion which may come into contact with a solution or a material containing a component such as a polar organic solvent, which deteriorates the adhesion of the water repellent agent. The epoxy resin composition can also be used for water repellent and ink repellent treatment of the discharge orifice surface of the liquid-jet recording head.

EXAMPLES

The present invention is described in further detail below with reference to examples and comparative examples. In the description below, "%" represents a % by mass unless otherwise specified. Examples of the construction of the resin composition of the present invention are described below. In the description below, a ratio represents a ratio by mass of a solid content, and resins A-1 and A-2 respectively represent the above-described resin examples.

The composition Examples 1 to 8 were prepared.

Composition Example 1

Resin A-1: Optomer AP-170=96:4 (used in Example 1 below)

Composition Example 2

Resin A-1: Optomer AP-170=94:6 (used in Example 2 below)

Composition Example 3

Resin A-1: Optomer AP-170:1,4-bis(2-hydroxyhexafluoroisopropyl)benzene=95:5:25 (used in Example 3 below)

Composition Example 4

Resin A-1: Optomer AP-170:1,4-bis(2-hydroxyhexafluoroisopropyl)benzene:2,2-bis(4-glycidyloxyphenyl)hexafluoropropane=80:5:25:25 (used in Example 4 below)

Composition Example 5

Resin A-2: Optomer AP-170=96:4 (used in Example 5 below)

Composition Example 6

Resin A-2: Optomer AP-170=94:6 (used in Example 6 below)

Composition Example 7

Resin A-2: Optomer AP-170:1,4-bis(2-hydroxyhexafluoroisopropyl)benzene=95:5:25 (used in Example 7 below)

Composition Example 8

Resin A-2: Optomer AP-170:1,4-bis(2-hydroxyhexafluoroisopropyl)benzene:2,2-bis(4-glycidyloxyphenyl)hexafluoropropane=80:5:25:25 (used in Example 8 below)

Examples 1 to 8

Each of Composition Examples 1 to 8 was added to diethylene glycol dimethyl ether as a solvent, and dissolved therein to form a 30% to 40% solution. Then, each of the prepared solutions was applied to a silicon wafer substrate having a 5-μm thick thermally oxidized film by means of a spinner to have a thickness of 1 to 3 μm in a wet state. Then, the substrate was dried on a hot plate of 110° C. for 5 minutes to remove the solvent. Then, the substrate was irradiated with ultraviolet rays to an accumulated dose of 2 J/cm² by means of an ultraviolet ray irradiation apparatus using a high-pressure mercury lamp. Thereafter, the substrate was heated in a furnace of 150° C. for 15 minutes to complete the curing reaction. The thus-formed eight substrates were measured as described below.

T1: Measurement of Contact Angle

The static contact angle of the cured film of each of the substrates was measured by using pure water, a 10% aqueous solution of oleic acid, a 20% aqueous solution of glycerin, and a 1% aqueous solution of a surfactant (polyoxyethylene nonyl phenyl ether; HLB=10) at room temperature.

T2: Measurement of Contact Angle after Immersion in a Water Dispersion of Dye)

Each of the substrates having the cured films was immersed in an aqueous solution (pH=10.3) containing 5% of carbon black and 1% of styrene/acrylic acid copolymer at 60° C. for 7 days. Then, each of the substrates was cleaned with pure water, and then dried, and the contact angles of an ink were measured again by the same method as the above-described measurement T1.

T3: Long-Term Printing Durability

Figure 4A:
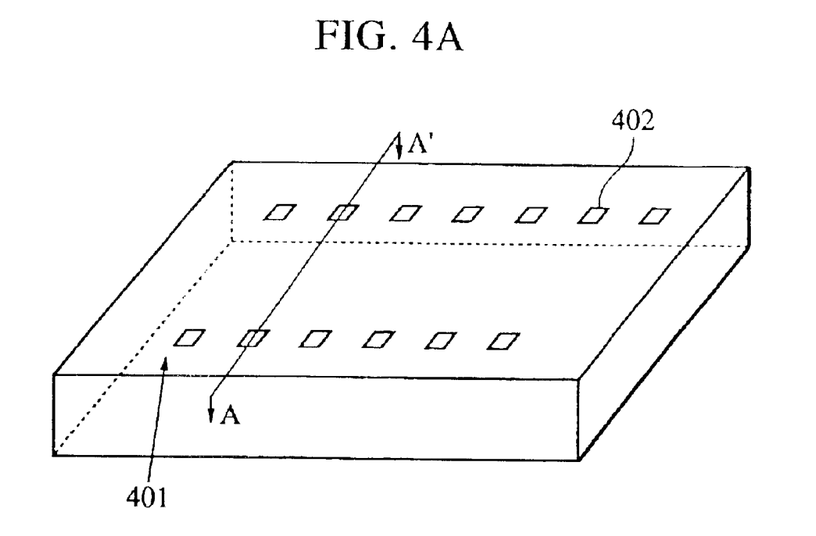
FIGS. 4A to 4C are drawings respectively showing steps of a method of manufacturing a liquid-jet recording head of the present invention.
Figure 4B:
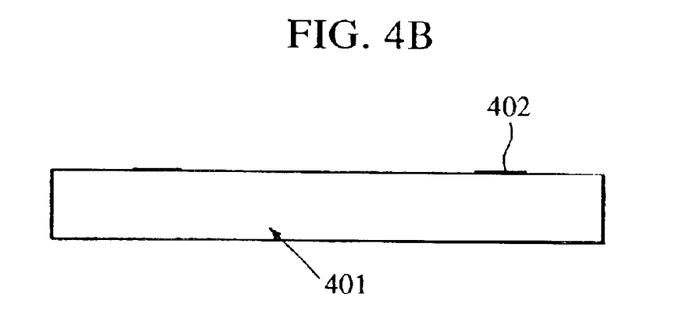
Figure 4C:
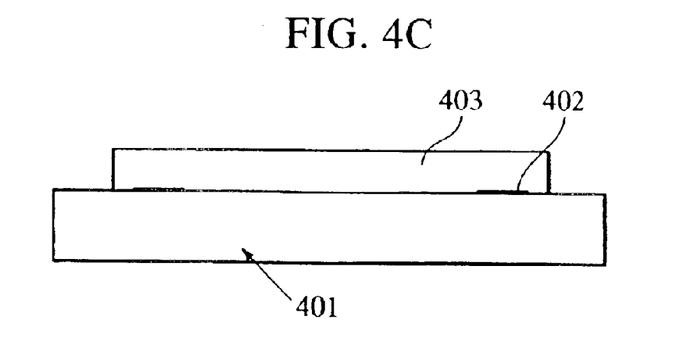
Figure 5A:
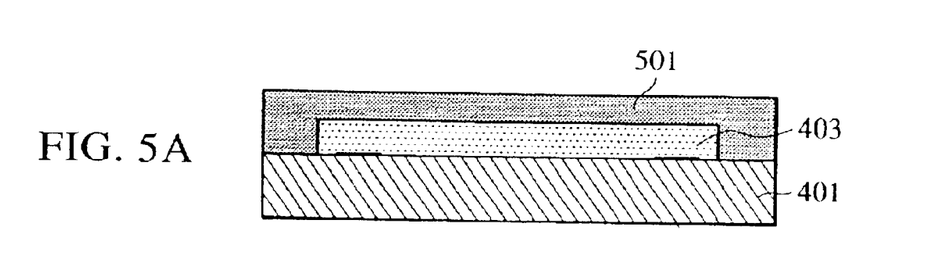
FIGS. 5A to 5E are drawings respectively showing steps performed after the steps shown in FIG. 4C.

As shown in FIGS. 4A to 4C, positive type photoresist (trade name ODUR-1010, produced by Tokyo Ohka Kogyo Co., Ltd.) was coated to a thickness of 13 to 14 μm on a substrate 401 to be treated, which was previously provided with discharge energy generating elements 402, etc., by spin coating to form a resist layer 403, as shown in FIG. 4C. Then, an epoxy resin composition having the composition shown in Table 1 was deposited to a thickness of 25 μm as a flow path forming material 501 on the resist layer 403, as shown in FIG. 5A.

TABLE 1

Construction of epoxy resin composition

| Composition | Parts by mass |
| --- | --- |
| Cyclic epoxy resin (EHPE3150, Daicel Chemical Co., Ltd.) | 95 |
| NUC silane coupling agent A-187 (produced by Nippon Uniker Co., Ltd.) | 5 |
| Optomer SP-170 (produced by Asahi Denka Kogyo Co., Ltd.) | 2 |
| Diethylene glycol dimethyl ether | 100 |

Figure 5B:
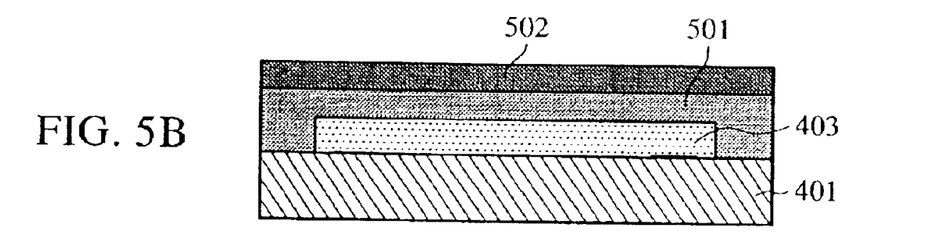
Figure 5C:
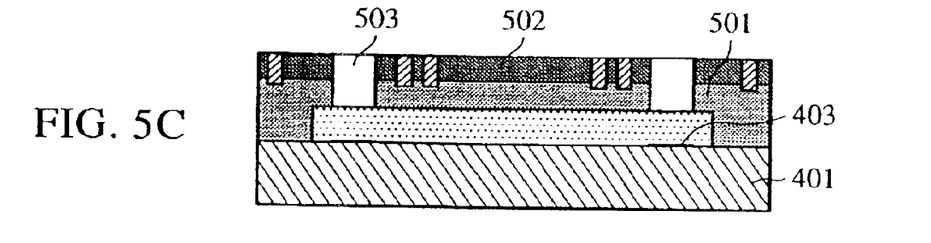
Figure 5D:
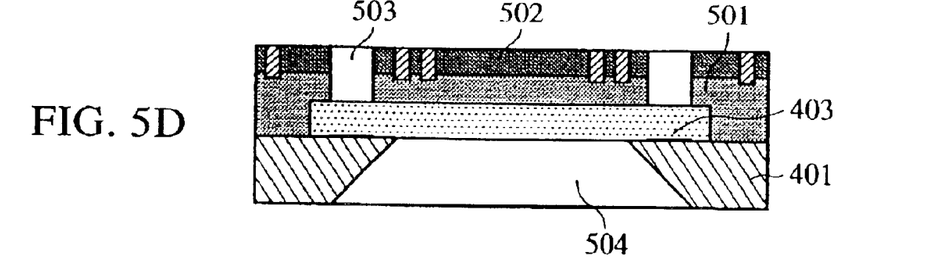
Figure 5E:
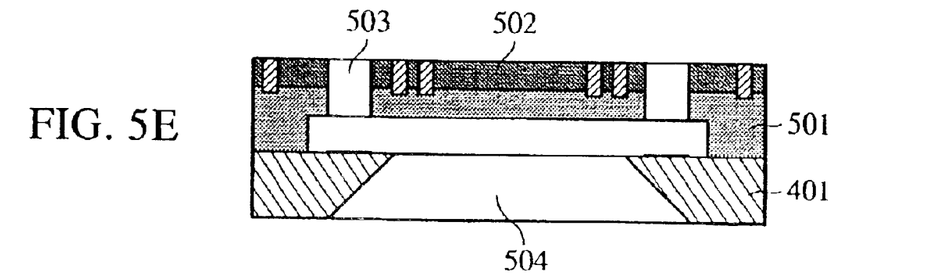

After the flow path forming material layer 501 was deposited, it was dried at 80° C. on a hot plate for 3 minutes. Then, a solution of each of Examples 1 to 4 respectively containing Composition Examples 1 to 4 was coated on the deposited layer by spin coating to form a film 502, as shown in FIG. 5B. The thus-formed first (501) and second (502) photosensitive resin layers were exposed to ultraviolet rays of 1.0 J/cm² through a mask having the pattern of a discharge orifice portion by using Canon mask analyzer MPA600, heat-treated at 90° C. 4 for minutes, and then immersed in a developer containing MIBK and xylene at a ratio of 2/3 to form discharge orifices 503 (FIG. 5C). Then, as shown in FIG. 5D, an ink supply port 504 was formed at the back of the Si substrate 401 by anisotropic etching, and the resist layer 403 was finally removed as shown in FIG. 5E. Furthermore, the first (501) and second (502) photosensitive resin layers were heat-treated at 200° C. for 1 hour for the purpose of completely curing the layers to complete nozzles (FIG. 5E).

The thus-obtained nozzles were incorporated into an ink-jet recording head, and electrically wired in a predetermined manner. The ink-jet recording head was mounted in a printer, and a long-term printing durability test was conducted by using an ink-jet ink comprising pure water, glycerin, food black 2 (water-soluble black dye), and N-methylpyrrolidone at a ratio of 70:15:3:12 (parts by mass).

The printing durability test was conducted by printing a document and a pattern for evaluation of ink landing precision on 100 sheets of paper. Finally, the distortion of the printed dots was observed by referring to a sample print. The results are shown in the column T3-1 in Table 2.

Rank A: Dot positions were not replaced, and printed characters were clear.

Rank B: Dot positions were slightly replaced, and printed characters were only slightly affected by the replacement.

Rank C: Dot positions were considerably replaced, and printed characters were poorly clear.

In addition, the surface of each of the recording heads used was observed after the test to evaluate ink adhesion. The results are shown in the column T3-2 in Table 2.

Rank A: Ink droplets were scarcely observed on the nozzle surface.

Rank B: Small ink droplets were observed on the nozzle surface.

Rank C: Large ink droplets were observed near the discharge port of the nozzle.

Comparative Example 1

Each of the measurements T1 to T3 was performed by the same method as Example 1 except that bisphenol AF (the structure below), which was a fluorine-containing epoxy resin, was used in place of the epoxy resin of Example 1. The results are shown in Table 2.

Structural Formula

Bisphenol AF

Comparative Example 2

Instead of the fluorine-containing silicone aryl epoxy resin composition used in the present invention, Flurorad TM FC-722 (fluoro-coating agent, produced by Sumitomo 3M) was coated on a molded plate of polyether sulfone by using a spinner so that the thickness after evaporation of the solvent was about 2 μm. Then, the surface of the resultant coating was treated by drying at 100° C. for 30 minutes. Then, this plate was irradiated with an exicmer laser at a wavelength of 195 μm, which was converged to a beam diameter of 5 μm, from above to form a nozzle opening. However, the opening could not be satisfactorily formed, and a large amount of decomposition residue was produced at the edge to cause a nonuniform surface state. Under this condition, a substrate was formed by the same method as Example 1, and the same evaluations as T1 to T3 were performed by the same methods as Example 1. The results are shown in Table 2.

TABLE 2

| | T1: Contact angle (°) | | | | T2: Immersion test contact angle (°) | | T3: Long-term printing durability test | |
|---|---|---|---|---|---|---|---|---|
| | Pure water | Oleic acid | Glycerin | Surfactant | Before | After | T3-1 | T3-2 |
| Example 1 | 99 | 88 | 98 | 93 | 92 | 82 | A | B |
| Example 2 | 106 | 93 | 102 | 88 | 95 | 83 | A | A |
| Example 3 | 107 | 97 | 107 | 92 | 97 | 87 | A | A |
| Example 4 | 108 | 100 | 111 | 95 | 100 | 90 | A | A |
| Example 5 | 99 | 88 | 98 | 93 | 92 | 82 | A | A |
| Example 6 | 106 | 93 | 102 | 88 | 95 | 83 | A | A |
| Example 7 | 107 | 97 | 107 | 92 | 97 | 87 | A | A |
| Example 8 | 108 | 100 | 111 | 95 | 100 | 90 | A | A |
| Comp. Example 1 | 89 | 72 | 87 | 80 | 90 | 74 | C | C |
| Comp. Example 2 | 105 | 97 | 108 | 92 | 106 | 90 | C | C |

As described above, a film comprising the resin composition of the present invention exhibits a large contact angle, and excellent durability. Therefore, ink tends not to adhere to the surface of the printing head even if the surface is held in contact with ink for a long period of time. As a result, ink droplets have excellent landing precision, and a high printing quality can be maintained for a long period of time.

Example 9

Each of Composition Examples 1 and 3 respectively used in Examples 1 and 3 was coated on a molded plate of polyether sulfone by using a spinner so that the thickness after evaporation of the solvent was about 2 μm, and then dried. Then, this plate was irradiated with light with a total of 10 Jule/cm² from a high-pressure mercury lamp to perform polymerization curing of the film. Then, the plate was irradiated with an excimer laser at a wavelength of 195 μm, which was converged to a beam diameter of 5 μm, from above to form a nozzle opening. The opening could be satisfactorily formed, and no decomposition residue was produced at the edge to cause a good processed state. As a result, it is found that the composition of the present invention has excellent suitability to processing with an ultraviolet laser, Example 10

A nozzle forming test was conducted by the same method as Example 9 using each of the epoxy resin compositions respectively used in Examples 4 and 6. As a result, like in Example 9, the opening could be satisfactorily formed, and no decomposition residue was produced at the edge to cause a good processed state.

As described above, according to the present invention, there is provided a resin composition suitable as a water-repellent agent or water-repellent coating material applied to a portion which is apt to be brought into contact with a solution and substance containing a component that can damage the film forming property and adhesion of a water-repellent agent. Also, according to the present invention, there is provided a resin composition permitting a surface modifying treatment for making it possible to maintain a same surface state.

Furthermore, according to the present invention, there is provided an ink-jet recording head and liquid-jet recording apparatus in which the surface of a nozzle can be maintained in a same surface state by treating the substrate with the resin composition of the present invention so that ink would not adhere to the surface of a printing head even if it is in contact with the ink for a long period of time, thereby improving the landing precision of dots, and maintaining print quality for a long time.

Also, the epoxy resin composition of the present invention can provide a film having excellent abrasion property, particularly an abrasion property with a laser with an oscillation wavelength in the ultraviolet region. Therefore, the present invention can be suitably used for forming a water-repellent film on a surface of a member required to have fine processability.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An epoxy resin composition comprising:
   an epoxy resin; and
   a cationic polymerization catalyst,
   wherein the epoxy resin comprises, in one molecule thereof, a perfluoroalkyl group having 6 to 12 carbon atoms, at least two alicyclic epoxy groups, an alkylsiloxane group, and a cyclic group other than the at least two alicyclic epoxy groups, and
   wherein the perfluoroalkyl group, the at least two alicyclic epoxy groups, and the cyclic group are present in a branched chain of the epoxy resin, and the alkylsiloxane group is present in the main chain of the epoxy resin.

2. An epoxy resin composition according to claim 1, wherein the epoxy resin is represented by formula (1):

(wherein a is an integer of 1 to 50, b is an integer of 1 to 50, c is an integer of 1 to 50, d is an integer of 2 to 100, each of n1 to n3 and n5 to n7 is an integer of 1 to 5, n4 is an integer of 2 to 200, R1, R4 to R7, R10 and R15 are independently a hydrogen atom or a straight or branched alkyl group having 1 to 3 carbon atoms, R2, R3, R8 and R9 are independently a hydrogen atom, a straight or branched alkyl group having 1 to 3 carbon atoms, or a nitrile group, Rf is a perfluoroalkyl group having 6 to 12 carbon atoms, and Z represents a cyclic group).

3. An epoxy resin composition according to claim 1, wherein the cyclic group is at least one selected from groups represented by formulae (2) to (9):

4. An epoxy resin composition according to claim 2, wherein the epoxy resin is represented by formula (10):

5. An epoxy resin composition according to claim 1, wherein the cationic polymerization catalyst comprises an onium salt of a Lewis acid.

6. An epoxy resin composition according to claim 1, further comprising at least one compound represented by formula (11) or (12):

(wherein p is an integer of 0 to 2)

(wherein q is an integer of 0 and 2, and  is  or ).

7. A surface treatment method for selectively treating a surface of a substrate, the method comprising the steps of:
 (i) coating an epoxy resin composition according to any one of claims 1 and 2 to 6 on the surface of the substrate to form a film;
 (ii) selectively irradiating the film with an active energy ray; and
 (iii) dissolving an unirradiated portion of the film in a liquid capable of dissolving the film to remove the portion.

8. A surface treatment method for selectively treating a surface of a substrate, the method comprising the steps of:
 (i) coating an epoxy resin composition according to any one of claims 1 and 2 to 6 on the surface of the substrate to form a film;
 (ii) curing the film by polymerization; and
 (iii) selectively removing a portion of the film cured in the step (ii).

9. A liquid jet recording head comprising a discharge orifice for discharging a liquid, wherein at least the periphery of the discharge orifice is coated with a cured film of an epoxy resin composition according to claim 1.

10. A liquid-jet recording apparatus comprising a liquid-jet recording head according to claim 9.

* * * * *

UNITED STATES PATENT AND TRADEMARK OFFICE
CERTIFICATE OF CORRECTION

PATENT NO. : 6,846,520 B2
APPLICATION NO. : 10/334915
DATED : January 25, 2005
INVENTOR(S) : Akihiko Shimomura et al.

It is certified that error appears in the above-identified patent and that said Letters Patent is hereby corrected as shown below:

COLUMN 1
Line 41, "becomes" should read --become--.

COLUMN 2
Line 52, "to" should read --into--.

COLUMN 12
Line 35, "100 part" should read --100 parts--.

COLUMN 17
Line 62, "4 for" should read --for 4--.

COLUMN 18
Line 58, "exicmer" should read --excimer--.

COLUMN 19
Line 45, "laser," should read --laser.--.

COLUMN 22
Lines 43 to 49, formula (11) should read (11)

(wherein p is an integer of 0 to 2)

UNITED STATES PATENT AND TRADEMARK OFFICE
CERTIFICATE OF CORRECTION

PATENT NO. : 6,846,520 B2
APPLICATION NO. : 10/334915
DATED : January 25, 2005
INVENTOR(S) : Akihiko Shimomura et al.

It is certified that error appears in the above-identified patent and that said Letters Patent is hereby corrected as shown below:

COLUMN 22
Line 63 to 67, "0 and 2, and  ," should read --0 to 2, and  --.

COLUMN 23
Line 4, "claims 1 and 2 to 6" should read --claims 1 to 6--.

COLUMN 24
Line 1, "claims 1 and 2 to 6" should read --claims 1 to 6--.

Signed and Sealed this

Twenty-fourth Day of October, 2006

JON W. DUDAS
*Director of the United States Patent and Trademark Office*